US005283936A

United States Patent [19]

Pickles et al.

[11] Patent Number: 5,283,936

[45] Date of Patent: Feb. 8, 1994

[54] APPARATUS FOR REMOVING PRESS FIT PINS

[75] Inventors: James Pickles, Wilmerding; Alvin J. Matthews, Pittsburgh, both of Pa.

[73] Assignee: Westinghouse Air Brake Company, Wilmerding, Pa.

[21] Appl. No.: 28,597

[22] Filed: Mar. 8, 1993

Related U.S. Application Data

[63] Continuation of Ser. No. 917,537, Jul. 21, 1992, abandoned, which is a continuation of Ser. No. 737,087, Jul. 29, 1991, abandoned.

[51] Int. Cl.[5] .......................... B23P 19/04; B25B 7/02

[52] U.S. Cl. .................................... 29/268; 29/267; 81/426

[58] Field of Search ................. 29/221, 267, 268, 278, 29/266, 265, 264, 258, 257, 248, 426.1, 426.2; 81/418, 419, 424.5, 426

[56] References Cited

U.S. PATENT DOCUMENTS

| | | | |
|---|---|---|---|
| 1,316,409 | 9/1919 | Bahre | 29/248 |
| 1,678,313 | 7/1928 | Atkinson | 29/268 |
| 2,154,580 | 4/1939 | Perrin et al. | 29/268 |
| 2,220,317 | 11/1940 | Cynoske | 29/248 |
| 2,958,561 | 11/1960 | May . | |
| 3,063,236 | 11/1962 | Cannon | 29/268 |
| 3,208,801 | 9/1965 | McClure . | |
| 3,234,634 | 2/1966 | Johnson et al. | 29/257 |
| 3,307,250 | 3/1967 | Goodwin et al. | 29/257 |
| 3,314,320 | 4/1967 | Early | 29/268 |
| 3,504,950 | 4/1970 | McClure . | |
| 4,222,985 | 9/1980 | Greenleaf | 29/268 |
| 4,617,710 | 10/1986 | Kotnik | 29/268 |
| 4,787,139 | 11/1988 | Sweet | 29/268 |
| 5,058,414 | 10/1991 | Hayes | 29/764 |

*Primary Examiner*—P. W. Echols
*Assistant Examiner*—David P. Bryant
*Attorney, Agent, or Firm*—J. O. Ray, Jr.

[57] ABSTRACT

An apparatus for removing a press-fit pin from a bore in an article, such as a press-fit pin in aligned bores of a cam dog for a railway brake apparatus. The apparatus has a pair of spaced jaws, moveable towards each other, one of the jaws having a peg extending outwardly therefrom and towards the other jaw, while the other jaw preferably has a groove in the end. Upon placement of an article on one jaw, and movement of the jaws together, the peg forces at least a portion of the press-fit pin from the bore and into the groove. The press-fit pin can then be grasped at the exposed portion and removed from the bore.

6 Claims, 2 Drawing Sheets

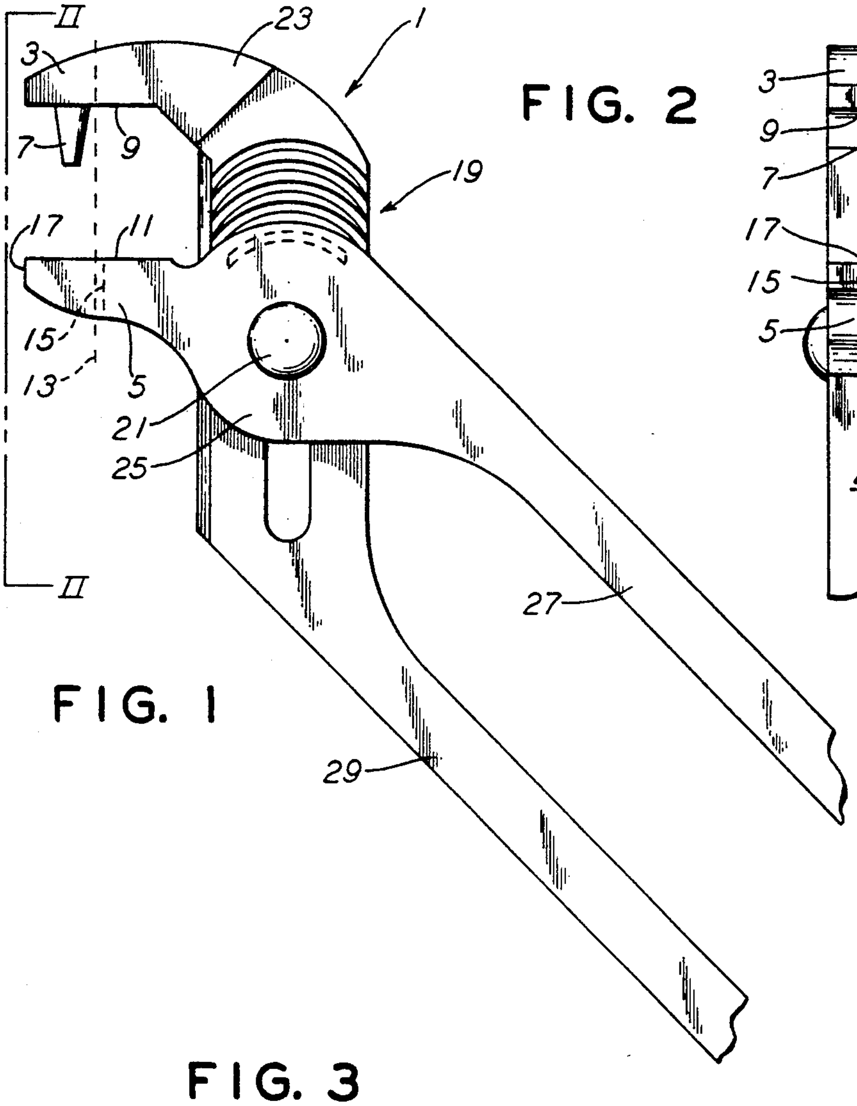
FIG. 1
FIG. 2
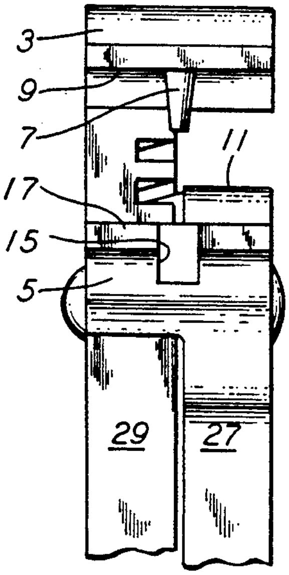
FIG. 3
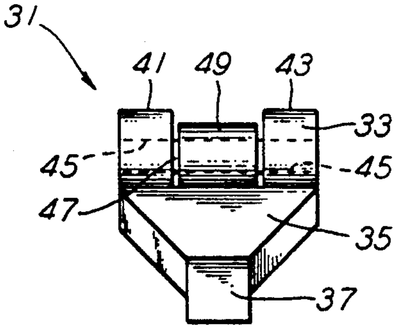
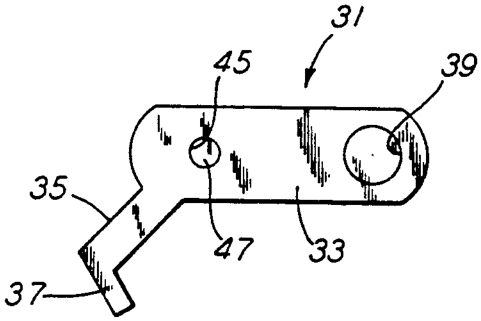
FIG. 4

APPARATUS FOR REMOVING PRESS FIT PINS

This is a continuation of application Ser. No. 07/917,537 filed Jul. 21, 1992, now abandoned, which was a continuation of application Ser. No. 07/737,087 filed Jul. 29, 1991, now abandoned.

CROSS REFERENCE TO RELATED APPLICATIONS

The invention claimed in this application is closely related to the following concurrently filed applications owned by the assignee of this invention. "Valve Seat Reconditioning Apparatus" having Ser. No. 07/737,094; "Method of Reconditioning Valves" having Ser. No. 07/736,992; and "Valve Reconditioning Process" having Ser. No. 07/736,979.

FIELD OF THE INVENTION

The present invention relates, in general, to removal of a press fit pin secured in a bore of a component and, more particularly, the present invention relates to an apparatus for removing such press fit pins from the bore of such component which will not require impacting of such pin with a hammer and punch.

BACKGROUND OF THE INVENTION

Prior to the present invention, it has been known to remove pins from the bore of an aperture in a component using a punch and hammer. This practice can be difficult at times due to space limitations. Furthermore, when the person removing such pin is not careful, damage can occur to the bore of the component which may necessitate replacement of such component.

SUMMARY OF THE INVENTION

The present invention provides an apparatus for removing a press-fit pin secured in a bore of an article, such as a press-fit pin through a roller member of a cam dog of a railway brake or truck brake apparatus, without damaging the other parts of the article.

The apparatus comprises a pair of spaced jaws that have confronting faces, with a peg on the face of a first of the jaws extending outwardly therefrom towards the second of the pair of jaws, the jaws moveable towards each other. The face of the second jaw is adapted to situate the article in a position such that the peg is aligned with the press-fit pin and, upon movement of at least one of the pair of jaws towards the other of the pair of jaws, the peg contacts the pin and forces the press-fit pin from the bore containing the pin.

The jaw that does not have the peg thereon is either shortened, has a groove therein, or has an aperture therethrough, such that the portion of the pin forced from the bore can pass the face of that jaw and may subsequently be grasped to remove the pin completely from the bore. The peg is preferably in the shape of a truncated cone and extends substantially perpendicularly from the face of the jaw on which it is situated.

Either one of the jaws may be movable towards the other jaw, which may remain stationary, or both of the jaws may be pivotally movable towards each other.

OBJECTS OF THE INVENTION

It is an object of the present invention to provide an apparatus that is used to remove a press-fit pin from a bore in an article.

It is another object of the present invention to provide an apparatus for removing a press-fit pin from a bore in an article that is of relatively simple construction and economical to produce.

It is a further object of the present invention to provide an apparatus for removing a press-fit pin from a bore in an article that does not require hammering of or otherwise repetitively impacting of a press-fit pin to remove the pin from the bore in an article such that damage to the pin or the article does not result.

It is yet another object of the present invention to provide a method of removing a press-fit pin from a bore in an article without the need to hammer or otherwise repetitively impacting the pin.

It is yet a further object of the present invention to provide a method of removing a press-fit pin of a cam dog of a railway or truck brake apparatus, which press-fit pin is situated in bores in two spaced ears on the cam dog and carries a roller member therebetween, without damaging the pin or other portions of the cam dog.

In addition to the several objects and advantages of the apparatus and method of removing a press-fit pin from a bore of an article described above, various other objects and advantages of the present invention will become more readily apparent to those skilled in the art from the following detailed description of the invention, particularly when such description is taken in conjunction with the attached drawing figures and with the appended claims.

BRIEF DESCRIPTION OF THE DRAWINGS

FIG. 1 is a side elevational view, with portions of the handles cut away, of an embodiment of the apparatus of the present invention;

FIG. 2 is a view taken along lines II—II of FIG. 1, of the end of the jaws of the apparatus illustrated in FIG. 1;

FIG. 3 is a front perspective view of a cam dog of a railway brake apparatus containing a press-fit pin for which the apparatus of the present invention is adapted for use;

FIG. 4 is a side view of the cam dog of the railway brake apparatus illustrated in FIG. 3;

DETAILED DESCRIPTION

Figure 5:
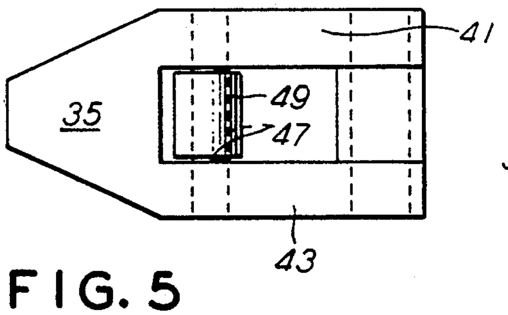
FIG. 5 is a top plan view of the cam dog of the railway brake apparatus illustrated in FIG. 3, with the press-fit pin in place.

The present invention provides a tool for removing a press-fit pin from a bore in an article and a method of use of such an apparatus. The apparatus and method of the present invention are particularly adapted for removing a press-fit pin from a cam dog that is provided in a railway brake apparatus without damaging other portions of the cam dog.

Referring now to FIGS. 1 and 2, an apparatus 1 for removing a press-fit pin secured in the bore of an article is illustrated, the apparatus 1 having a pair of spaced jaws 3 and 5. The first jaw 3 of the pair of spaced jaws has a peg 7 on a face 9, that extends outwardly from the face 9 in a direction transverse to a confronting face 11 on the second jaw 5 of the pair of spaced jaws. The peg 7 preferably extends substantially perpendicularly from the face 9 of first jaw 3, and is most preferably in the shape of a truncated cone, as illustrated. In the embodiment of the apparatus 1 shown in FIG. 1, the second jaw 5 extends beyond a plane, indicated at 13, along which the peg 7 extends from the face 9 of first jaw 3. An opening, preferably in the form of a groove 15 is provided in the terminal end 17 of the second jaw 5.

The face 11 of the second jaw 5 is adapted to situate an article in position where the peg 7 on the first jaw 3 is aligned with a pin in the bore of an article, such that upon moving at least one of the pair of jaws 3 or 5 towards the other of the pair of jaws, the peg 7 will contact the pin and force at least a portion of the pin from the bore. A means 19 for moving at least one of the pair of spaced jaws 3 or 5 towards the other of said pair of spaced jaws, with the faces 9 and 11 maintained in confronting relationship, is provided. Such means 19 may be of various constructions well known to those skilled in the art. In the embodiment illustrated in FIG. 1, the means 19 for moving at least one of the jaws 3 or 5 towards the other jaw comprises a pivotal linkage 21 through jaw supports 23 and 25, the jaw supports 23 and 25 having handles 27 and 29 respectively, such that movement of the handles 27 and 29 together will, through pivotal linkage 21, move second jaw 5 towards the first jaw 3. Such a pivotal linkage is well known in the art, such as that used in "CHANNELLOCK" gripping devices, sold by Channellock, Inc. of Meadville, Pa. Such a pivotal linkage uses a pin connecting the two jaw supports together, which pin is moveable in a slot and an arcuate protrusion in one of the jaw supports is engageable in spaced arcuate grooves in the other of the jaw supports.

The apparatus is especially useful in removing a press-fit pin from a cam dog of a railway brake apparatus, such as the cam dog 31, illustrated schematically in FIGS. 3 and 4. The cam dog 31 has a body portion 33 with a downwardly extending portion 35 having a trip lever 37 at the end thereof. The body portion 33 has an aperture 39 therethrough and a groove therein forming a pair of upstanding spaced ears 41 and 43. Ears 41 and 43 have aligned bores 45 therethrough into which a press-fit pin 47 is secured, with a rotatable roller 49 carried by the press-fit pin 47 between the ears 41 and 43. As the cam dog 31 is subject to Wear after extended use, it become necessary to remove the press-fit pin 47 and roller 49 to refurbish the cam dog 31. Previous removal was carried out by driving the press-fit pin 47 from the bores 45 by impacting the end of the press-fit pin 47, which often led to damage of the press-fit pin 47 or other portions of the cam dog 31.

Figure 6:
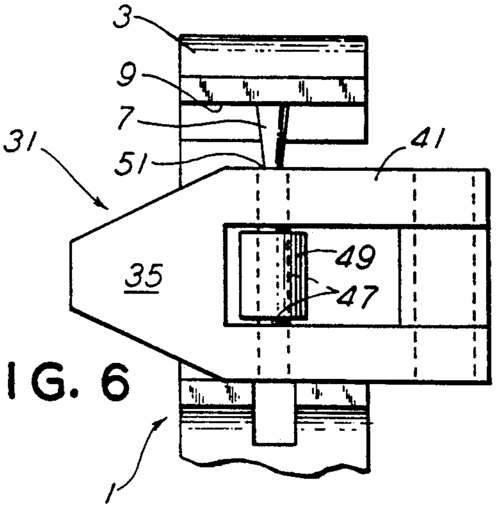
FIG. 6 is a view similar to that of FIG. 5, showing the cam dog positioned between the jaws of the apparatus shown in FIG. 1 ready for removal of the press-fit pin.
Figure 7:
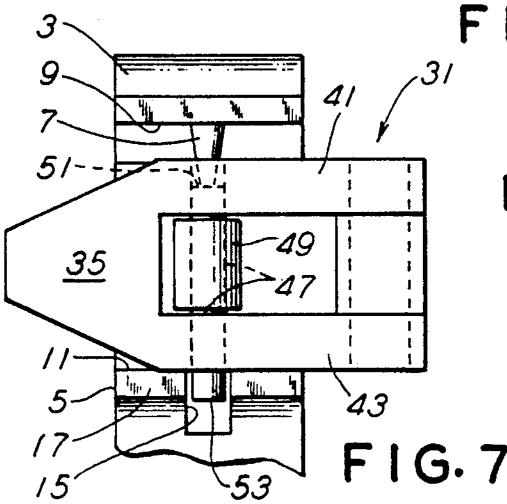
FIG. 7 is a view similar to FIG. 6, showing movement of a jaw of the apparatus such that the peg on a first jaw forces a portion of the press-fit pin from a bore.
Figure 8:
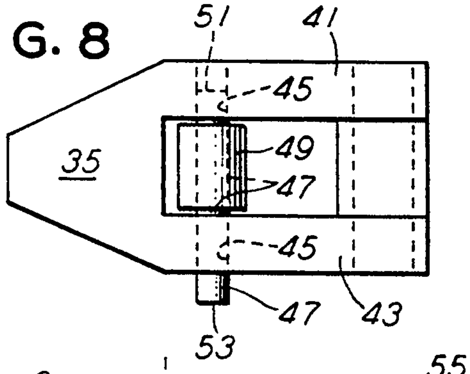
FIG. 8 is a view similar to FIG. 5 showing a portion of the press-fit pin exposed from the bore of the cam dog such that the same may be grasped and completely removed from the cam dog.

The removal of the press-fit pin 47 from a cam dog, such as cam dog 31, according to the present method is schematically illustrated by reference to FIGS. 5–8. FIG. 5 illustrates a top plan view of cam dog 31 from which the press-fit pin 47 is to be removed. As shown in FIG. 6, an apparatus 1 for removing a press-fit pin from the bore of an article is provided, the article shown as cam dog 31, and the cam dog 31 is situated on the second jaw 5 of apparatus 1 with a peg 7 aligned with one end 51 of press-fit pin 47 in the cam dog 31, and the groove 15 in second jaw 5 aligned with the other end 53 of the press-fit pin 47. The cam dog 31 rests on the face 11 of second jaw 5 of apparatus 11, which provides support therefor. At least one of the jaws 3 or 5 of the apparatus 11, such as second jaw 5, is then moved towards the other jaw, such as first jaw 3, such that the peg 7 contacts the one end 51 of the press-fit pin 47, and, as shown in FIG. 7, forces at least a portion, such as the other end portion 53 of the press-fit pin 47, from the bore 45 in ear 43, with the end portion 53 entering the groove 15 in the terminal portion 17 of second jaw 5. Once a sufficient portion of the end 53 of the press-fit pin 47 is forced from the bore 45 in ear 43 of the cam dog 31, the cam dog 31 can be removed from the apparatus 1. In this condition, as shown in FIG. 8, the end 53 of the press-fit pin can be grasped and removed completely from the bore 45, either by hand or by the use of a gripping device, and the roller 49 removed from the cam dog 31.

Figure 9:
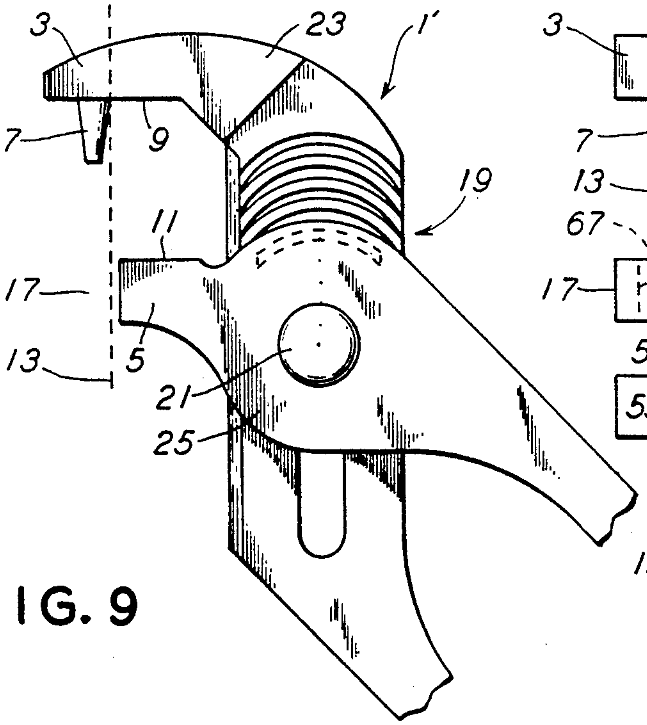
FIG. 9 s a side elevational view of the jaw portion of another embodiment of the apparatus of the present invention having a shortened second jaw.

FIG. 9 illustrates another embodiment of an apparatus of the present invention for removing a press-fit pin from a bore of an article where the second jaw 5 terminates short of the plane 13 along which the peg 7 extends. As illustrated, apparatus 1', wherein like parts relative to the apparatus 1 of FIG. 1 are labelled alike, has first jaw 3 which carries peg 7, while the second jaw 5 has a terminal end 17 that terminates short of, and out of the plane 13, along which peg 7 extends from the face 9 of the first jaw 3.

As can readily can be seen in FIGS. 6,7,8 & 9, the planar surface 11 of jaw 5 closely conforms to the planar surface of the cam dog 31 which it contacts. In this way pressure is applied evenly generally over the whole planar surface of the jaw 11 to prevent damage to the planar surface of the cam dog 31 when pressure is applied to it by jaw 5. As illustrated, peg 7 is located near the distal end of jaw 3 and the distance from the pivot point 21 to the location of the peg 7 is several times the distance through which the jaw 3 can move before the peg 7 contacts an end of the pin 47 secured to the cam dog 31 so that movement of the peg 7 over a relatively short distance is generally along the plane 13. Further the peg 7 is relatively short in relation to the overall length of pin 47 so that the penetration of peg 7 into the bore 45 in the cam dog 31 is limited by the planar face 9 of jaw 3. Face 9 is made to closely conform to the planar surface of the cam dog 31 surrounding the bore 45 for pin 47. Before pin 47 removal is started, the space between the jaws 3 and 5 and the end of peg 7 is adjusted to very closely approximate the size of the cam dog 31 which is to be worked on. When the jaws 3 and 5 are moved toward each other, the peg 7 will move substantially along the longitudinal axis of pin 47 and bore 45. Longitudinal movement of peg 7 is limited by contact of planar face 9 of jaw 3 with body portion 33 of the cam dog 31.

As further explained herein, final removal of the pin 47 is accomplished by grasping the portion of the pin 47 which has been exposed by the action described above. Because of the relatively short distance of movement of the peg 7 compared to the length of radius of its movement, i.e. the distance from the pivot 21 to the centerline of peg 7, peg 7 moves in a generally linear direction rather than an arcuate direction. As stated above this insures that pressure is applied to pin 47 along its longitudinal axis where such pressure is most effective and avoids binding of the pin 47 or of the peg 7 in the bore 45. As can clearly be seen the jaws 3 and 5 will remain in a generally parallel relationship to each other during this relatively short and limited motion toward each other.

Figure 10:
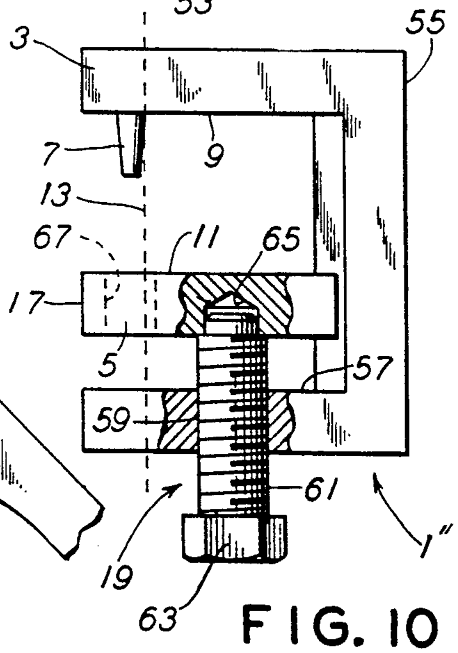
FIG. 10 is a side elevational view of a further embodiment of the apparatus of the present invention.

In FIG. 10, a further embodiment of an apparatus of the present invention for removing a press-fit pin from a bore of an article is illustrated. In this embodiment, apparatus 1" has first jaw 3 with peg 7 extending away from a face 9 thereof, while the means 19 for moving a jaw is provided without a pivotal linkage. As illustrated, a C-frame 55 is provided having the first jaw 3 and a support arm 57 through which a threaded bore 59 is formed. A threaded member 61 is threadedly engaged in the threaded bore 59, preferably having a knob 63, the threaded member having second jaw 5 on the end thereof with face 11 on the second jaw confronting face 9 on the first jaw 3. A rotatable linkage 65 is provided between threaded member 61 and second jaw 5 that permits the threaded member to rotate while the jaw 5 may be maintained in a non-rotational position. By rotating knob 63, the threaded member 61 will, through threaded engagement in threaded bore 59, move the second jaw 5 towards the first jaw 3, with the faces 11 and 9 maintained in confronting relationship. In this embodiment also, rather than having a groove formed in the terminal end 17 of second jaw 5, an aperture 67 is formed through second jaw 5 in alignment with the peg 7, for entry therein of an end of a press-fit pin forced from a bore of an article.

What is claimed is:

1. An apparatus for removing a pin press-fitted into a bore of an article, said apparatus comprising:

(a) a first jaw member having a substantially flat first face;

(b) a second jaw member having a substantially flat second face, said first face of said first jaw member being in confronting relationship to said second face of said second jaw member;

(c) a tapered peg member having a truncated cone shape secured to a predetermined portion of said first face and extending outwardly therefrom towards said second face, said second face of said jaw member being configured such that said tapered peg member will not contact said second face even when at least a portion of said first face is in contact with said second face;

(d) a means engageable with each of said first jaw member and said second jaw member for moving at least one of said first and said second jaw members towards an opposite one of said first and second jaw members while maintaining said first face and said second face in confronting relationship, said means including;

i. a first jaw support secured at a first end thereof to one end of said first jaw member, ii. a second jaw support secured at a first end thereof to one end of said second jaw member, iii. a pivotal linkage member engageable with each of said first jaw support and said second jaw support, said pivotal linkage member including an elongated slot formed in one of said first and said second jaw supports and a pin member secured to an opposite one of said first and said second jaw supports which extends through said elongated slot, iv. an arcuately shaped boss disposed on an inner surface of one of said first and said second jaw supports, and v. a plurality of arcuately shaped grooves formed on an inner surface of an opposite one of said first and said second jaw supports which matingly engage said arcuately shaped boss;

(e) a first handle member secured at one end thereof to a second end of said first jaw support; and (f) a second handle member secured at one end thereof to a second end of said second jaw support.

2. An apparatus according to claim 1, wherein the longitudinal centerline of said peg member extends substantially perpendicularly from said first face of said first jaw member.

3. An apparatus according to claim 1, wherein said second jaw member includes a terminus spaced from a plane which extends along the longitudinal centerline of said pin.

4. An apparatus according to claim 1, wherein said second jaw member extends beyond a plane which extends along the longitudinal centerline of said pin and wherein an opening is provided in said second jaw member coaxially aligned with said peg member, into which said pin fits upon forcing said pin from said bore.

5. An apparatus according to claim 4, wherein said opening comprises a groove in a terminal end of said second jaw member.

6. An apparatus according to claim 1, wherein one of said first and said second jaw members is maintained as a stationary jaw and an opposite one of said first and second jaw members is movable towards said stationary jaw.

* * * * *

UNITED STATES PATENT AND TRADEMARK OFFICE

CERTIFICATE OF CORRECTION

PATENT NO. : 5,283,936

DATED : 2/8/94

INVENTOR(S) : James Pickles et al.

It is certified that error appears in the above-indentified patent and that said Letters Patent is hereby corrected as shown below:

Column 2, line 36, insert --portions-- after end.

Column 4, line 6, delete "11" after apparatus and insert --1--;

column 4, line 8, delete "11" after apparatus and insert --1--.

Column 6, line 1, insert --said-- after and.

Signed and Sealed this

Nineteenth Day of July, 1994

*Attest:*

BRUCE LEHMAN

*Attesting Officer*

*Commissioner of Patents and Trademarks*